US008265095B2

(12) United States Patent
Fritz et al.

(10) Patent No.: US 8,265,095 B2
(45) Date of Patent: Sep. 11, 2012

(54) RESOURCE MANAGEMENT FINITE STATE MACHINE FOR HANDLING RESOURCE MANAGEMENT TASKS SEPARATE FROM A PROTOCOL FINITE STATE MACHINE

(75) Inventors: Rolf Fritz, Waldenbuch (DE); Thomas Schlipf, Holzgerlingen (DE)

(73) Assignee: International Business Machines Corporation, Armonk, NY (US)

( * ) Notice: Subject to any disclaimer, the term of this patent is extended or adjusted under 35 U.S.C. 154(b) by 460 days.

(21) Appl. No.: 12/629,093

(22) Filed: Dec. 2, 2009

(65) Prior Publication Data

US 2011/0131582 A1 Jun. 2, 2011

(51) Int. Cl.
*H04L 12/66* (2006.01)
*G06F 3/00* (2006.01)

(52) U.S. Cl. .......................................... 370/463; 710/59
(58) Field of Classification Search ...................... 710/59
See application file for complete search history.

(56) References Cited

U.S. PATENT DOCUMENTS

| 5,613,163 | A  | * | 3/1997  | Marron et al. | 710/59     |
|-----------|----|---|---------|---------------|------------|
| 5,838,991 | A  | * | 11/1998 | Shipman       | 710/59     |
| 6,182,231 | B1 | * | 1/2001  | Gilgen        | 710/59     |
| 6,260,098 | B1 | * | 7/2001  | Ku            | 710/59     |
| 6,275,876 | B1 | * | 8/2001  | Valk et al.   | 710/59     |
| 6,333,935 | B1 | * | 12/2001 | Carr et al.   | 370/442    |
| 6,606,164 | B1 | * | 8/2003  | Irie et al.   | 710/59     |
| 6,643,329 | B1 | * | 11/2003 | Wu et al.     | 375/240.25 |
| 6,851,006 | B2 | * | 2/2005  | McDaniel      | 710/261    |
| 7,194,562 | B2 | * | 3/2007  | Barnes et al. | 710/59     |
| 7,734,938 | B2 | * | 6/2010  | Kim           | 370/463    |
| 2004/0132441 | A1 | * | 7/2004 | Livet et al. | 455/422.1  |
| 2009/0248934 | A1 | * | 10/2009 | Ge et al.   | 710/261    |

* cited by examiner

*Primary Examiner* — Timothy J Weidner
(74) *Attorney, Agent, or Firm* — Schmeiser, Olsen & Watts; Thomas E. Tyson

(57) ABSTRACT

A method and logic circuit for a resource management finite state machine (RM FSM) managing resource(s) required by a protocol FSM. After receiving a resource request vector, the RM FSM determines not all of the required resource(s) are available. The protocol FSM transitions to a new state, generates an output vector, and loads the output vector into an output register. The RM FSM transitions to a state indicating that not all the resources are available and freezes an input register. In a subsequent cycle, the RM FSM freezes the output register and a current state register, and forces the output vector to be seen by the FSM environment as a null token. After determining that the required resource(s) are available, the RM FSM transitions to another state indicating that the resources are available, enables the output vector to be seen by the FSM environment, and unfreezes the protocol FSM.

25 Claims, 11 Drawing Sheets

RESOURCE MANAGEMENT FINITE STATE MACHINE FOR HANDLING RESOURCE MANAGEMENT TASKS SEPARATE FROM A PROTOCOL FINITE STATE MACHINE

FIELD OF THE INVENTION

The present invention relates to a data processing method and system for implementing communication protocols in input/output (I/O) hardware, and more particularly to a technique for handling resource management tasks by a resource management finite state machine separate from a protocol finite state machine.

BACKGROUND OF THE INVENTION

In known highly complex network protocols finite state machines (FSMs) become very complex, thereby making the encoding of protocol FSMs very difficult. One of the reasons for the complexity is that the FSMs must take into account the availability of several required resources before the FSMs can start a processing task. The FSMs request resources (and the resources may be granted in sequence) and remember which resources have already been granted and which resources still need to be requested. For a typical functional state performing a task, there are multiple sub-states that reflect the achieved ownership of the required resources. Thus, there exists a need to overcome at least one of the preceding deficiencies and limitations of the related art.

SUMMARY OF THE INVENTION

In one or more embodiments, the present invention provides a logic circuit-implemented method of a resource management finite state machine (RM FSM) managing one or more resources required by a protocol finite state machine (protocol FSM) in a FSM environment. The method comprises:

the RM FSM receiving a resource request vector from the protocol FSM, wherein the resource request vector indicates the one or more resources required by the protocol FSM, wherein the RM FSM is in a first RM FSM state prior to receiving the resource request vector, and wherein the RM FSM being in the first RM FSM state indicates the one or more resources are available to the protocol FSM;

the RM FSM determining not all of the one or more resources are available to the protocol FSM;

subsequent to determining not all of the one or more resources are available, the protocol FSM transitioning from being in a first protocol FSM state (S1) to being in a second protocol FSM state (S2);

subsequent to determining not all of the one or more resources are available, the protocol FSM generating an output vector and loading the output vector into a first register for storing output, wherein the first register is coupled to the protocol FSM;

subsequent to determining not all of the one or more resources are available, the RM FSM transitioning to a second RM FSM state that indicates not all of the one or more resources are available to the protocol FSM;

subsequent to deter mining not all of the one or more resources are available, a logic circuit that implements the RM FSM freezing an input register coupled to the protocol FSM;

subsequent to determining not all of the one or more resources are available, the logic circuit that implements the RM FSM controlling the FSM environment by freezing the first register, freezing a current state register coupled to the protocol FSM, and forcing the output vector to be seen by the FSM environment as a null token;

subsequent to the RM FSM controlling the FSM environment, the RM FSM determining the one or more resources are available to the protocol FSM;

subsequent to determining the one or more resources are available, the RM FSM transitioning to the first RM FSM state;

subsequent to determining the one or more resources are available, the RM FSM enabling the output vector to be seen by the FSM environment as the output vector loaded into the first register by the loading; and subsequent to determining the one or more resources are available, the logic circuit that implements the RM FSM unfreezing the protocol FSM.

A logic circuit and system corresponding to the above-summarized method are also described and claimed herein.

One or more embodiments of the present invention provide a technique for employing a protocol FSM to which it appears that required resources are always available and a tightly interconnected resource management FSM that performs resource management tasks. The technique described herein simplifies the encoding of the protocol FSM by eliminating a need to encode behavior of the protocol FSM in response to the protocol FSM waiting for the delivery of all resources required by the protocol FSM.

DETAILED DESCRIPTION OF THE INVENTION

Overview

In embodiments of the present invention, a resource management finite state machine (RM FSM) is implemented to allow a protocol FSM to operate as if all the resources required by the protocol FSM are always available. This illusion of having all required resources always available to the protocol FSM is achieved by transferring complete control of resource handling tasks to the RM FSM and allowing the RM FSM to freeze the protocol FSM in response to the protocol FSM signaling a request for resources that are unavailable. If all resources requested by the protocol FSM become available, the protocol FSM is released by the RM FSM. As the protocol FSM is completely freed from the task of acquiring resources, it implements only those states and transitions in which the resources are available. The RM FSM has no knowledge of the protocol implemented by the protocol FSM, thereby allowing the reuse of the RM FSM for other protocol implementations.

RM FSM-Based System for Managing Resources

Figure 1A:
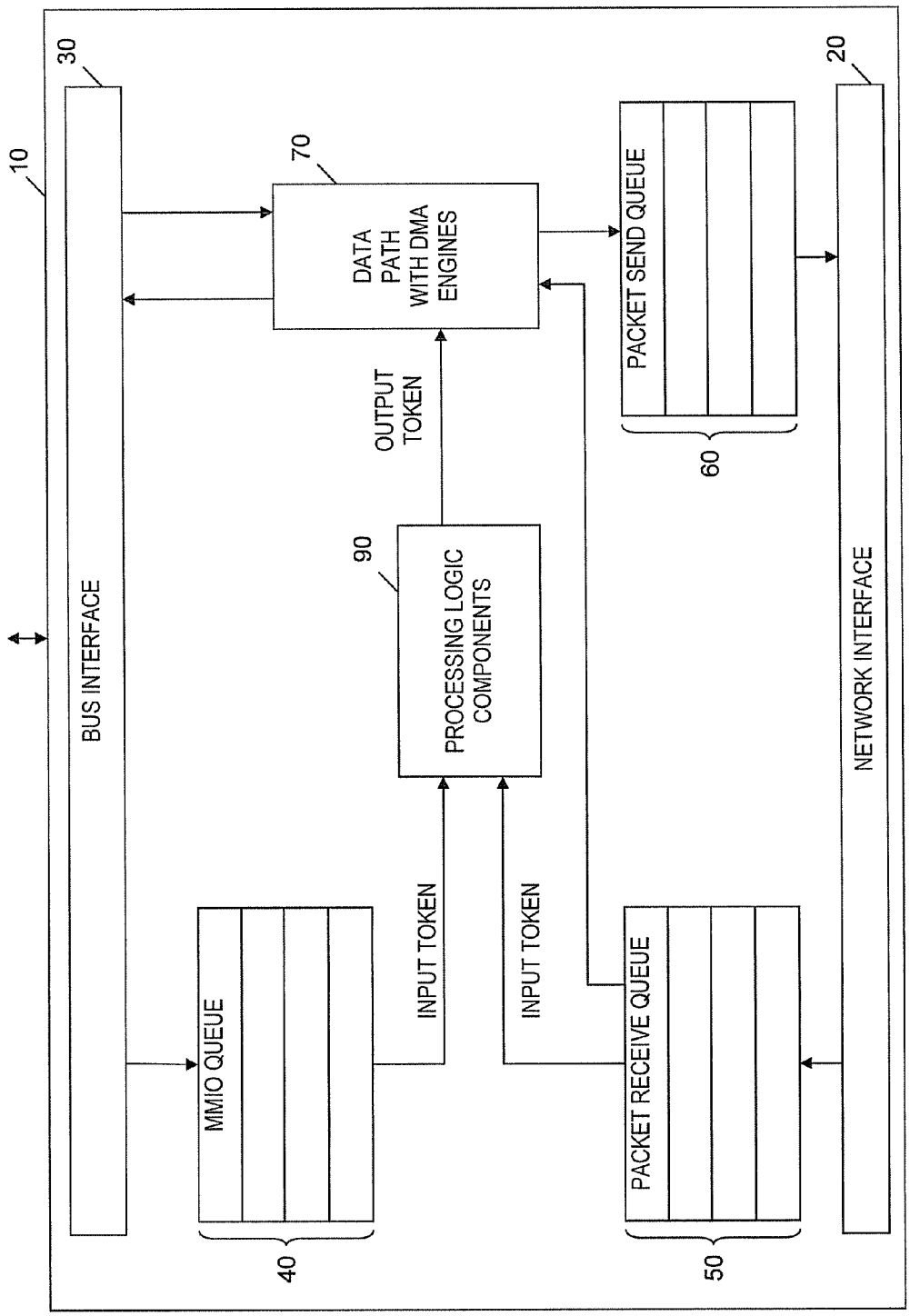
FIG. 1A is a block diagram of a system that includes a FSM environment and processing logic components for managing one or more resources required by a protocol FSM, in accordance with embodiments of the present invention.

FIG. 1A is a block diagram of a system that includes a FSM environment and processing logic components for managing one or more resources required by a protocol FSM, in accordance with embodiments of the present invention. In one embodiment, system 10 is a networking environment (e.g., storage networks or communication networks). The adapters used in system 10 include a network interface 20 (e.g., Ethernet or Fibre channel), a bus interface 30 (e.g., PCI-Express, HyperTransport, or QuickPath Interconnect (QPI)), a memory-mapped input/output (MMIO) queue 40 for managing MMIO operations, a packet receive queue 50 for storing incoming data packets, a packet send queue 60 for storing outgoing data packets, and a data path logic 70 to transfer data from the bus interface 30 to the networking interface 20 (and vice versa). There are one or several processing logic components 90, which parse the incoming packets, analyze the headers of these packets and generate the directives via output tokens to the Direct Memory Access (DMA) engines in the data path 70. Resources in the context of FIG. 1A are free entries in one of the queues 40, 50, 60, free DMA engines in data path 70, etc. If a resource is not available (e.g., all queue entries are busy), then processing cannot continue until a resource becomes free again. For this purpose, a credit based flow control scheme may be used. All communication in system 10 is event based and uses tokens. As seen from the processing logic 90, there are input tokens and output tokens. These tokens typically contain a valid-indicator. If this valid indicator is active then it is a valid token (which is interpreted and carried out). If the valid indicator is inactive no action occurs. The token with an inactive valid indicator is designated as null token. In one or more embodiments, the processing logic 90 is implemented as a FSM or set of FSMs. The components in FIG. 1A connected to the FSM or set of FSMs that implement processing logic 90 are herein designated as the FSM environment. Hereinafter, instead of the terms input token and output tokens, the description of the present invention uses the terms input vector and output vector, respectively, which are the terms typically used in describing FSMs. The term null token, however, is used herein to indicate an output vector which has no effect on the FSM environment.

Figure 1B:
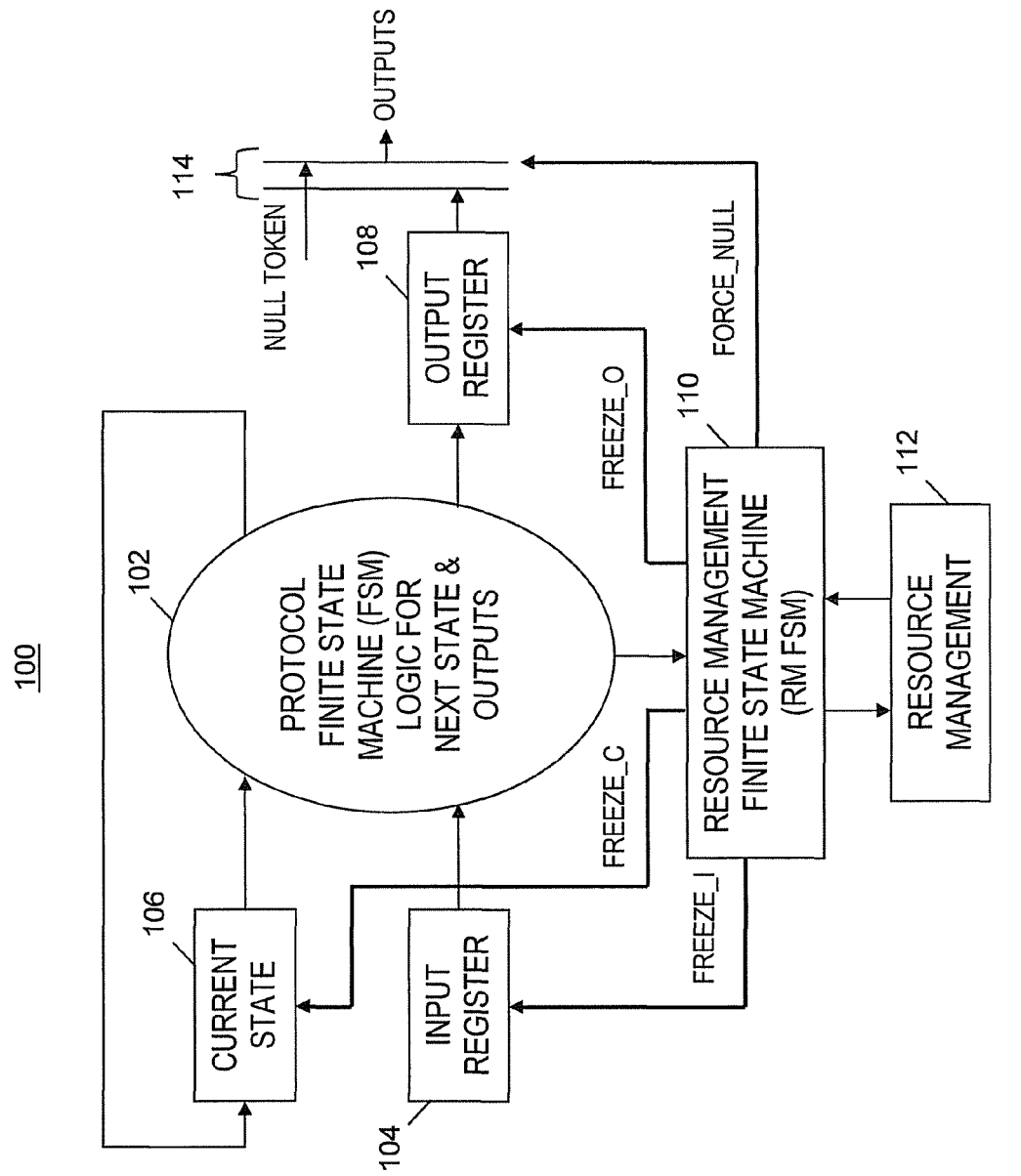
FIG. 1B is a block diagram of a first embodiment of a system that is included in the system of FIG. 1A and that includes a resource management FSM for managing one or more resources required by a protocol FSM, in accordance with embodiments of the present invention.

FIG. 1B is a block diagram of a first embodiment of a system that is included in the system of FIG. 1A and that includes a resource management FSM for managing one or more resources required by a protocol FSM, in accordance with embodiments of the present invention. System 100 is one embodiment of processing logic components 90 (see FIG. 1A) and includes protocol FSM logic 102 for determining a next state and outputs. Hereinafter, protocol FSM logic 102 is simply referred to as protocol FSM 102. Protocol FSM 102 uses input data (e.g., an input token) included in input register 104 and a current state 106 to generate a next state (i.e., an update of the current state) and output data (e.g., an output token). The output data is placed in output register 108. A resource request vector that indicates one or more resources required by the protocol FSM 102 to perform a task is sent from protocol FSM 102 to a RM FSM 110, which sends and receives parameter values used by or generated by a resource management component 112 that implements a resource management model. A multiplexer 114 multiplexes a signal that indicates a null output token and a signal from output register 108 to provide an output signal.

RM FSM 110 freezes the register that includes current state 106, the input register 104 and the output register 108 in response to determining that not all of the one or more resources required by protocol FSM 102 are available to logic 102. The signal labeled Freeze_o in FIG. 1B freezes output register 108. The signal labeled Freeze_c freezes current state register 106. The signal labeled Freeze_i in FIG. 1B freezes input register 104. The signal labeled Force_Null in FIG. 1B forces an inactive output vector to be visible to the FSM environment of system 100. In one embodiment, RM FSM 110 determines whether or not all of the resource(s) required by protocol FSM 102 are available by checking a set of variables that requests the resource(s) required by protocol FSM 102 (i.e., all the resource(s) required to satisfy a resource request vector sent by protocol FSM 102 and received by RM FSM 110).

The functionality of components of system 100 is discussed further below relative to FIGS. 4A-4B.

Figure 4A:
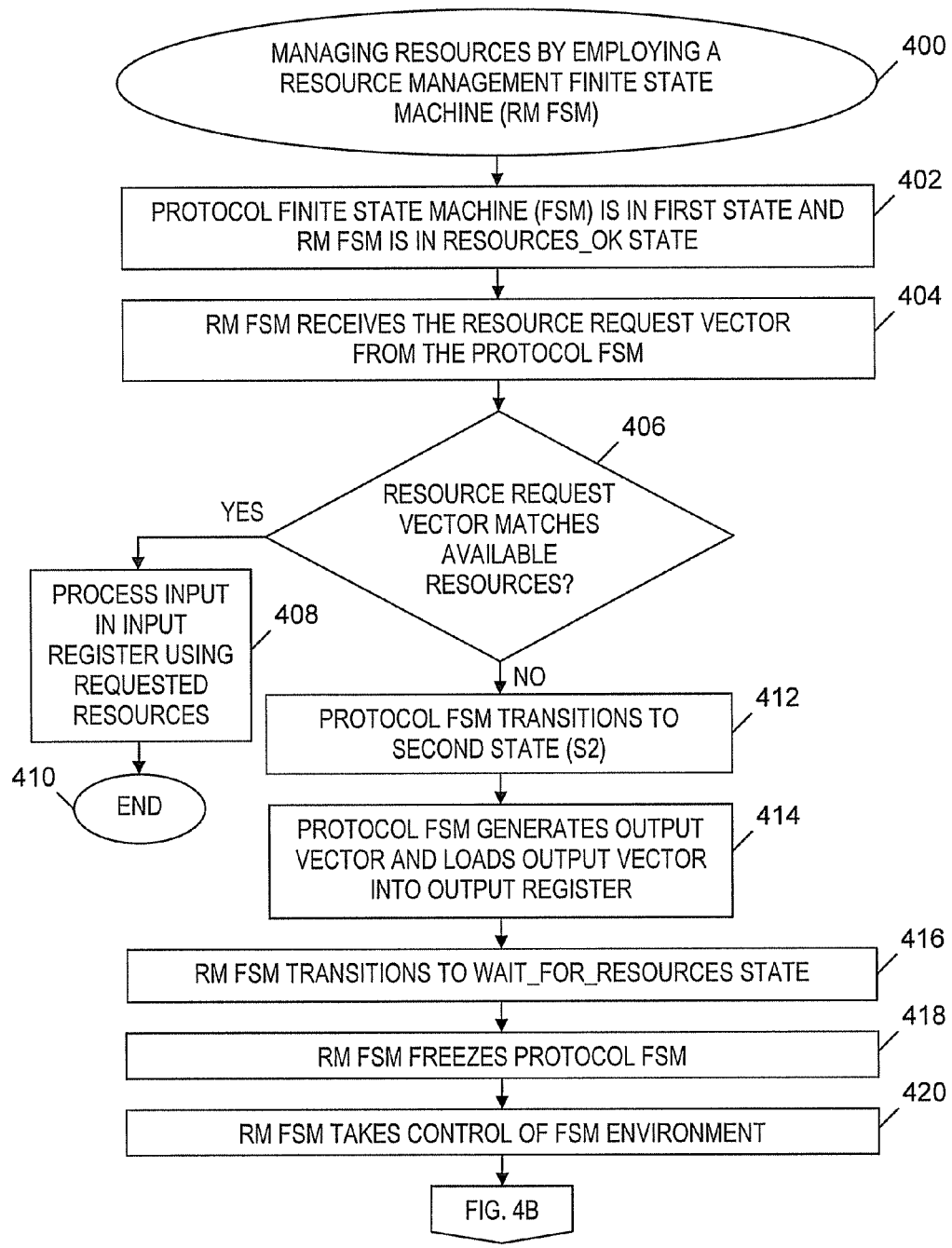
FIGS. 4A-4B depict a flowchart of a process for managing resources by employing the resource management FSM included in the system of FIG. 1B or FIG. 1C, in accordance with embodiments of the present invention.
Figure 4B:
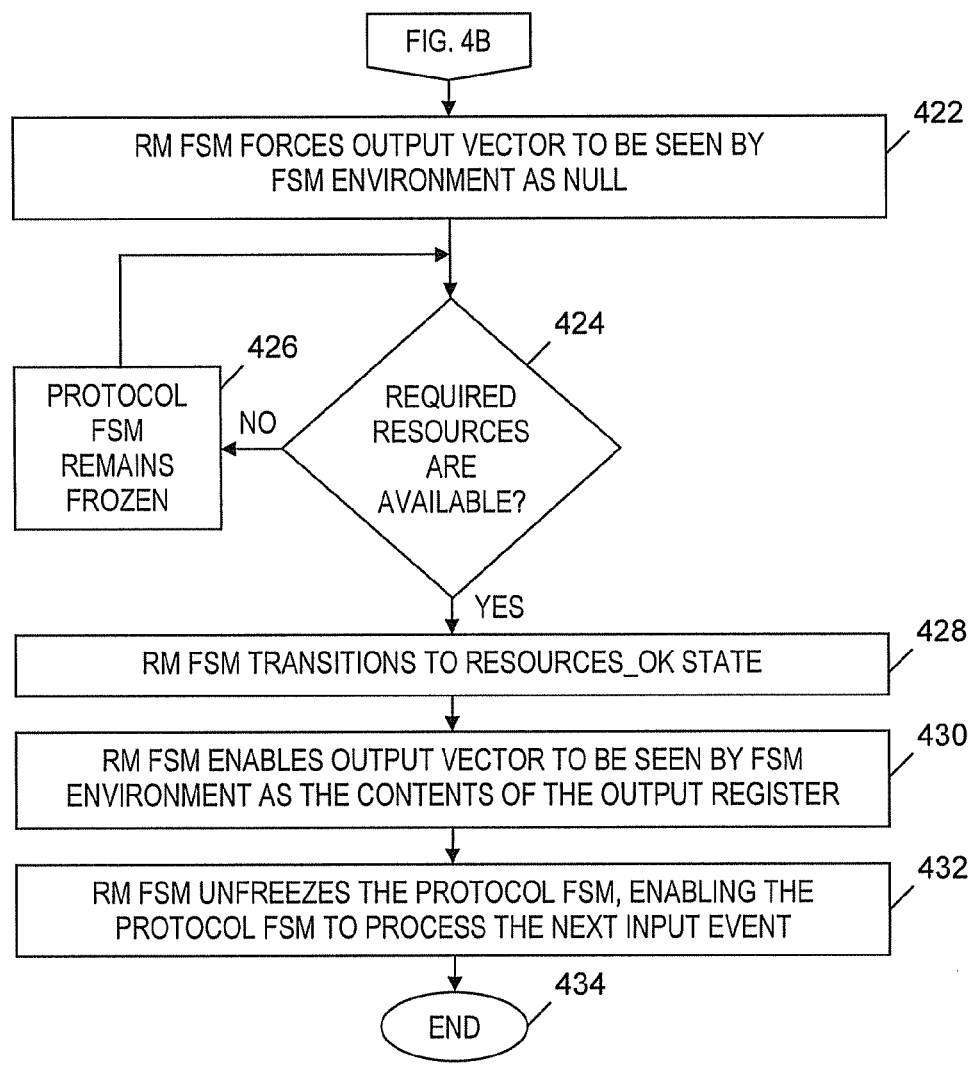

In one embodiment, protocol FSM logic 102 is implemented as logic circuitry (i.e., one or more logic circuits) comprising multiple electrically conductive elements that provide one or more blocks of combinational logic that perform operations included in the process of FIGS. 4A-4B. For example, logic 102 is logic circuitry included in a digital I/O chip.

In one embodiment, RM FSM 110 is implemented as logic circuitry (i.e., one or more logic circuits) comprising multiple electrically conductive elements that provide one or more blocks of combinatorial logic that perform operations included in the process of FIGS. 4A-4B. For example, RM FSM is logic circuitry included in a digital I/O chip.

In one embodiment, system 100 is an I/O adapter or network adapter (e.g., InfiniBand, Peripheral Component Interconnect (PCI) Express, Fibre Channel or Ethernet) that processes networking protocols.

In one embodiment, protocol FSM 102 is implemented by a virtual multiple instance finite state machine described in U.S. patent application Ser. No. 12/564,772, filed Aug. 25, 2009, which is hereby incorporated by reference herein in its entirety.

In one embodiment, protocol FSM 102 is implemented by a virtual multiple instance extended finite state machine described in U.S. patent application Ser. No. 12/546,852, filed Aug. 25, 2009, which is hereby incorporated by reference herein in its entirety.

Figure 1C:
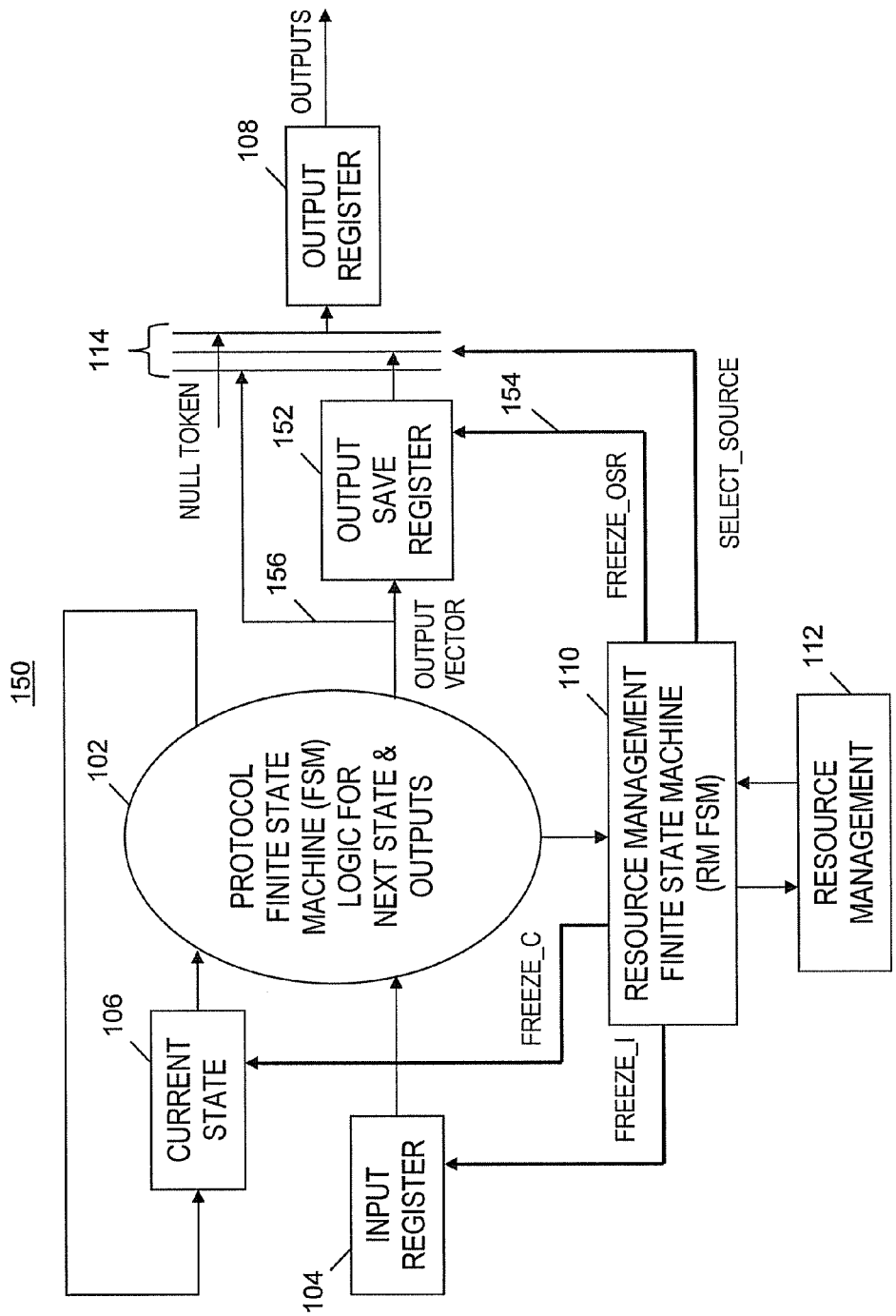
FIG. 1C is a block diagram of a second embodiment of a system that is included in the system of FIG. 1A and that includes a resource management FSM for managing one or more resources required by a protocol FSM, in accordance with embodiments of the present invention.

FIG. 1C is a block diagram of a second embodiment of a system that is included in the system of FIG. 1A and that includes a resource management FSM for managing one or more resources required by a protocol FSM, in accordance with embodiments of the present invention. The reason for choosing the structure in FIG. 1C would be that the multiplexer 114 in FIG. 1B is not possible due to timing reasons. One skilled in the art will be able to transform the structure in FIG. 1B to the structure in FIG. 1C. For example, one skilled in the art will realize that freezing and unfreezing the output register included in the structure of FIG. 1B as described below may be replaced with respectively freezing and unfreezing the output save register, which is included in the structure of FIG. 1C.

System 150 is one embodiment of processing logic components 90 (see FIG. 1A) and includes protocol FSM 102, input register 104, current state 106, RM FSM 110, and resource management component 112, which have the same functionality described above relative to FIG. 1B. The arrow labeled Freeze_i indicates a signal sent by RM FSM 110 that freezes input register 104. The arrow labeled Freeze_c indicates a signal sent by RM FSM 110 that freezes current state 106. System 150 differs from system 100 (see FIG. 1B) in that system 150 includes an output save register 152 (a.k.a. save register) that saves the output vector that protocol FSM 102 generates. As indicated by arrow 154, output save register 152 also receives a Freeze_osr signal 154 from RM FSM 110. The Freeze_osr signal freezes output save register 152. Multiplexer 114 multiplexes a null token signal, output from output save register 152, and the output vector generated by the protocol FSM, where the output vector is indicated by arrow 156.

The arrow labeled Select_Source indicates a signaling of multiplexer 114 to select the Null Token, the output vector sent by protocol FSM 102, or the contents of the output save register 152. The Select_Source signaling may be performed with three signals controlling each mux level at multiplexer 114 or with two signals which are encoded.

Again, in response to determining that not all of the one or more resources required by protocol FSM 102 are available, RM FSM 110 freezes the protocol FSM by freezing the registers in system 150 and forces the output vector seen by the FSM environment to be a null token. Further discussion of the functionality of components of system 150 is presented below relative to FIGS. 4A-4B.

Although for simplicity, the discussion presented below may refer only to FIG. 1B when mentioning components 102, 104, 106, 108, 110, 112 and/or 114, the present invention contemplates that these same components may also be found in the system of FIG. 1C.

The term "first register for storing output" (a.k.a. "first register") is used herein to refer to (1) output register 108 (see FIG. 1B) in embodiments that employ the system of FIG. 1B and (2) output save register 152 in embodiments that employ the system of FIG. 1C.

Figure 2:
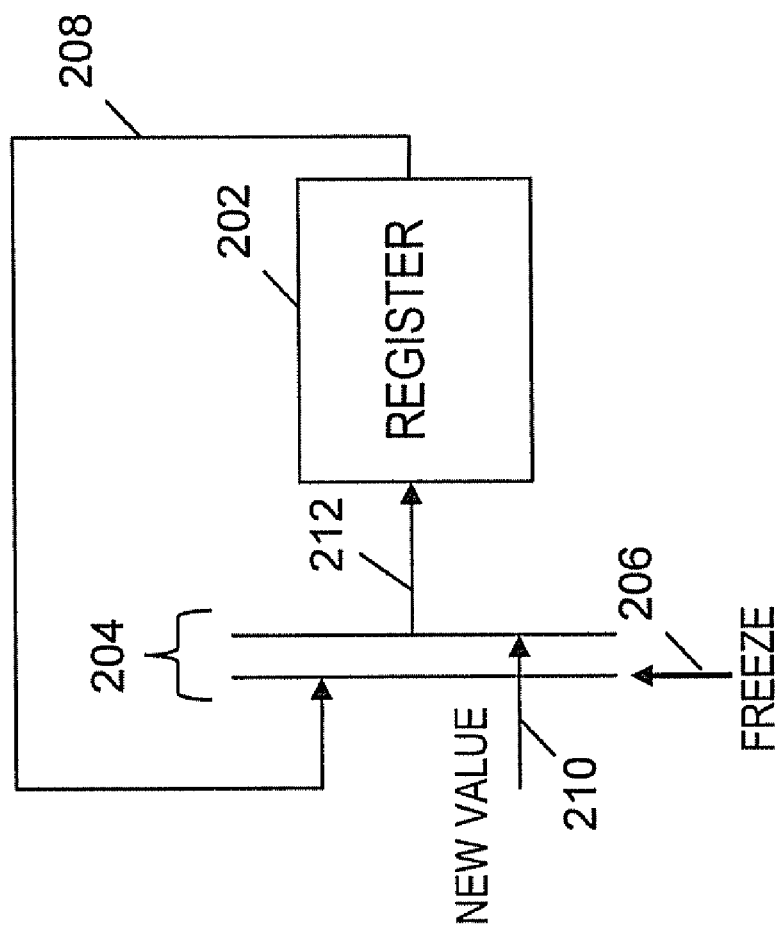
FIG. 2 is a block diagram of a frozen register included in the system of FIG. 1B or FIG. 1C, in accordance with embodiments of the present invention.

FIG. 2 is a block diagram of a frozen register included in the system of FIG. 1B or FIG. 1C, in accordance with embodiments of the present invention. A frozen register 202 is simply a normal register with a hold feedback path. The content of the register 202 (i.e., content 208) is fed back into a multiplexer 204. If the Freeze signal 206 is active (=1) then the current content of the register 202 (i.e., content 208) will be loaded via multiplexer 204 and a signal 212 into the register 202 again. If the Freeze signal is inactive (=0) then a new value 210 will be loaded in the next cycle into the register 202. Register 202 may be, for example, input register 104 (see FIG. 1B), current state register 106 (see FIG. 1B), or output register 108 (see FIG. 1B).

Figure 3:
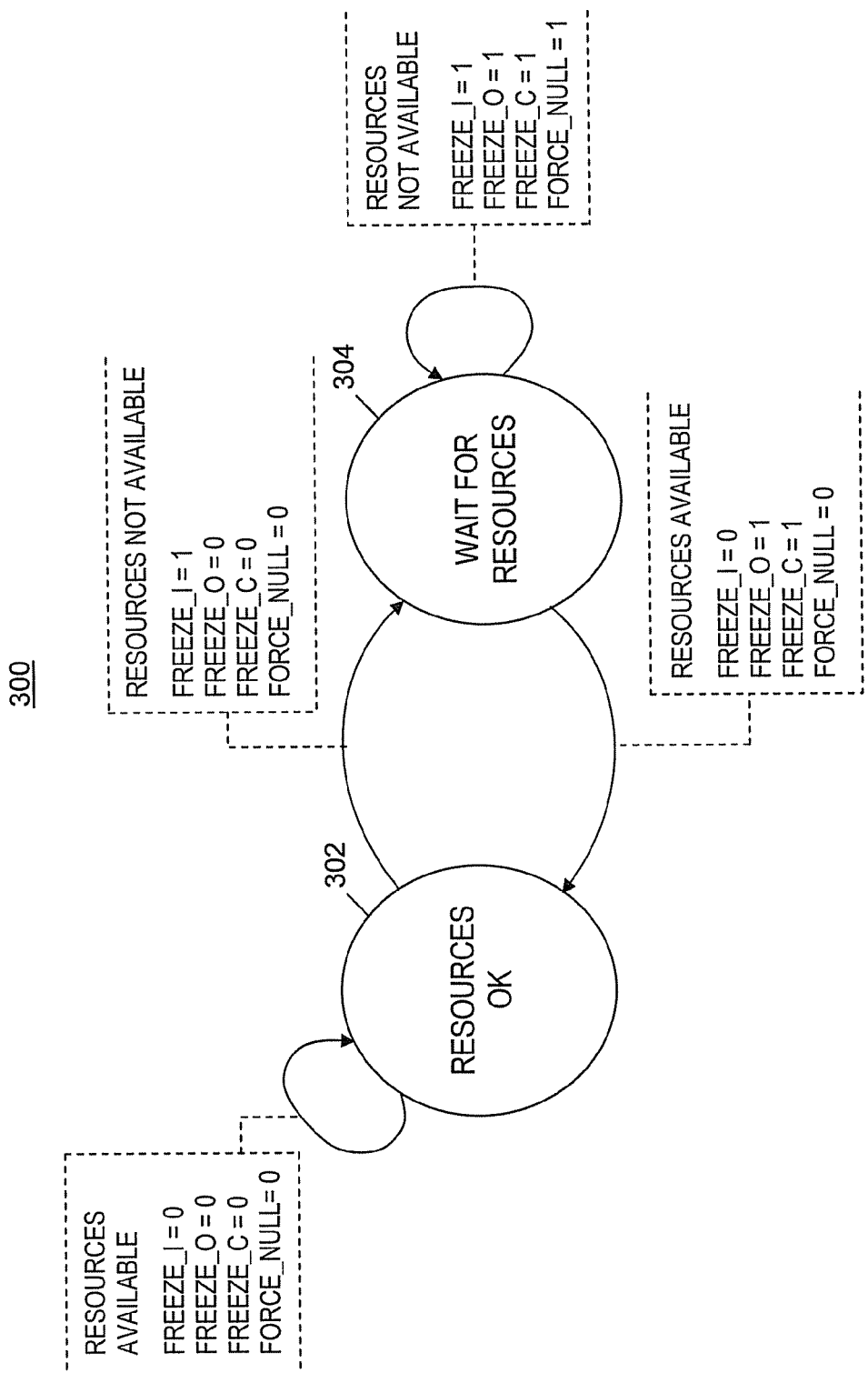
FIG. 3 is a block diagram of states of the resource management FSM included in the system of FIG. 1B, in accordance with embodiments of the present invention.

FIG. 3 is a block diagram of states of the resource management FSM included in the system of FIG. 1B, in accordance with embodiments of the present invention. States 300 of RM FSM 110 (see FIG. 1B) consist of a Resources OK state 302 (a.k.a. Resources_OK) and a Wait for Resources state 304 (a.k.a. Wait_for_Resources). While RM FSM 110 (see FIG. 1B) stays in the Resources OK state 302, the Freeze_i, Freeze_c, Freeze_o, and Force_Null signals are not activated (i.e., Freeze_i=0, Freeze_c=0, Freeze_o=0, and Force_Null=0, respectively). Freeze_i=0 indicates that input register 104 (see FIG. 1B) is not frozen. Freeze_c=0 indicates that current state register 106 (see FIG. 1B) is not frozen. Freeze_o indicates that output register 108 (see FIG. 1B) is not frozen. Force_Null=0 indicates that RM FSM 110 (see FIG. 1B) is enabling the output vector to be seen by the FSM environment as the contents of output register 108 (see FIG. 1B). Further, as long as the resource(s) (a.k.a. required resource(s)) required by protocol FSM 102 (see FIG. 1B) are available, the RM FSM remains in the Resources OK state 302. Also the RM FSM stays in the Resources OK state if there is no active Resource request vector from the protocol FSM (not shown in FIG. 3).

In response to at least one of the required resource(s) becoming unavailable, the RM FSM 110 (see FIG. 1B) transitions from state 302 to Wait for Resources state 304 and activates the Freeze_i signal (i.e., Freeze_i=1), which freezes input register 104 (see FIG. 1B). The Freeze_o, Freeze_c and Force_Null signals remain inactive (i.e., Freeze_o=0, Freeze_c=0 and Force_Null=0).

While the above-mentioned at least one required resource continues to be unavailable, the RM FSM 110 (see FIG. 1B) remains in the Wait for Resources state 304 and the Force_Null, Freeze_o, Freeze_c and Freeze_i signals are activated (i.e., Force_Null=1, Freeze_o=1, Freeze_c=1 and Freeze_i=1). Activating the Freeze_c signal freezes current state register 106 (see FIG. 1B) and activating the Freeze_o signal freezes output register 108 (see FIG. 1B). Activating the Force_Null signal forces the output vector to be seen by the FSM environment as a null token (rather than as the contents of output register 108 (see FIG. 1B)).

While the RM FSM 110 (see FIG. 1B) is in the Wait for Resources 304 state, if all of the required resource(s) are available, the RM FSM transitions to the Resources OK state 302, thereby driving Force_Null=0, Freeze_o=1, Freeze_c=1 and Freeze_i=0. Force_Null=0 deactivates the Force_Null signal, thereby enabling the output vector to be seen by the FSM environment as the contents of output register 108 (see FIG. 1B). Freeze_i=0 deactivates the Freeze_i signal, thereby unfreezing input register 104 (see FIG. 1B). Freeze_o=1 indicates that the Freeze_o signal is still active; therefore, the output register 108 (see FIG. 1B) remains frozen. Freeze_c=1 indicates that the Freeze_c signal is still active; therefore the current state register 106 (see FIG. 1B) remains frozen. In the next cycle, Freeze_o=0, Freeze_i=0 and Force_Null=0, thereby unfreezing the protocol FSM 102 (see FIG. 1B) and enabling the protocol FSM to process the next input event. As used herein, a cycle is defined as the time between two rising edges of a clock which is used to clock the input data into the registers.

Process for Managing Resources With a RM FSM

FIGS. 4A-4B depict a flowchart of a process for managing resources in an FSM environment by employing the resource management FSM included in the system of FIG. 1B or FIG.

1C, in accordance with embodiments of the present invention. The steps included in FIGS. 4A-4B illustrate the logical flow of the process for managing resources in an FSM environment by employing a RM FSM. It will be apparent to those skilled in the art that several steps in the process of FIGS. 4A-4B (e.g., steps 412-420 in FIG. 4A) may be carried out in parallel in hardware. The RM FSM-based resource management process begins at step 400. In step 402, protocol FSM 102 (see FIG. 1B) is in a first state S1 and RM FSM 110 (see FIG. 1B) is in a Resources OK state 302 (see FIG. 3).

In step 404, RM FSM 110 (see FIG. 1B) receives a resource request vector sent from protocol FSM 102 (see FIG. 1B), where the resource request vector indicates one or more resources (a.k.a. the required resource(s)) required by protocol FSM 102 (see FIG. 1B) based on input received from input register 104 (see FIG. 1B).

In step 406, RM FSM 110 (see FIG. 1B) determines if the resource request vector received in step 404 matches resources that are available to the protocol FSM 102 (see FIG. 1B). If step 406 determines that the resource request vector matches available resources, then the Yes branch of step 406 is taken and step 408 is performed. In step 408, protocol FSM 102 (see FIG. 1B) uses the requested resource(s) included in the resource request vector to process input in input register 104 (see FIG. 1B) to generate output placed in output register 108 (see FIG. 1B). Following step 408, the process of FIGS. 4A-4B ends at step 410. Returning to step 406, if RM FSM 110 (see FIG. 1B) determines that the resource request vector received in step 404 does not match available resources (i.e., one or more of the required resource(s) are not available), then the No branch of step 406 is taken and step 412 is performed.

In step 412, protocol FSM 102 (see FIG. 1B) transitions from the first state S1 (see step 402) to a second state S2.

In step 414, protocol FSM 102 (see FIG. 1B) generates the output vector and loads the output vector into output register 108 (see FIG. 1B).

In step 416, RM FSM 110 (see FIG. 1B) transitions from Resources OK state 302 (see FIG. 3) to Wait for Resources state 304 (see FIG. 3).

In step 418, RM FSM 110 (see FIG. 1B) freezes protocol FSM 102 (see FIG. 1B) by sending a Freeze_i signal to freeze input register 104 (see FIG. 1B).

In step 420, RM FSM 110 (see FIG. 1B) takes control of the FSM environment, which includes the RM FSM being able to send a Freeze_o signal, a Freeze_c signal and a Force_Null signal (see step 422 in FIG. 4B), and to control a determination of whether all the required resource(s) are available to protocol FSM 102 (see FIG. 1B). The process of FIGS. 4A-4B continues with step 422 in FIG. 4B.

In step 422 in FIG. 4B, RM FSM 110 (see FIG. 1B) sends a Freeze_c signal to freeze current state register 106 (see FIG. 1B), a Freeze_o signal to freeze output register 108 (see FIG. 1B). Also in step 422, the RM FSM 110 (see FIG. 1B) sends a Force_Null signal to force the output vector to be seen by the FSM environment as a null token, rather than as the contents of output register 108 (see FIG. 1B), which was loaded in step 414 (see FIG. 4A) with the generated output vector.

In step 424, RM FSM 110 (see FIG. 1B) determines whether all the required resource(s) are available to the protocol FSM 102 (see FIG. 1B). If step 424 determines that not all of the required resource(s) are available, then the No branch of step 424 is taken and step 426 is performed. In step 426, protocol FSM 102 (see FIG. 1B) remains frozen and the process loops back to step 424.

Returning to step 424 following step 422 (or step 426), if RM FSM 110 (see FIG. 1B) determines that all the required resource(s) are available, then the Yes branch of step 424 is taken and step 428 is performed. In step 428, RM FSM 110 (see FIG. 1B) transitions from Wait for Resources state 304 (see FIG. 3) to Resources OK state 302 (see FIG. 3).

In step 430, RM FSM 110 (see FIG. 1B) enables the output vector to be seen by the FSM environment as the contents of output register 108 (see FIG. 1B) (i.e., the output vector calculated in step 414 in FIG. 4A). In one embodiment, the enabling of the output vector to be seen by the FSM environment is performed by deactivating the Force_Null signal (i.e., Force_Null=0).

In step 432, RM FSM 110 (see FIG. 1B) unfreezes the protocol FSM 102 (see FIG. 1B) by deactivating Freeze_i, Freeze_o and Freeze_c signals (i.e., Freeze_i=0, Freeze_o=0 and Freeze_c=0), thereby enabling the protocol FSM 102 (see FIG. 1B) to process the next input event. The process of FIGS. 4A-4B ends at step 434.

EXAMPLES

Figure 5A:
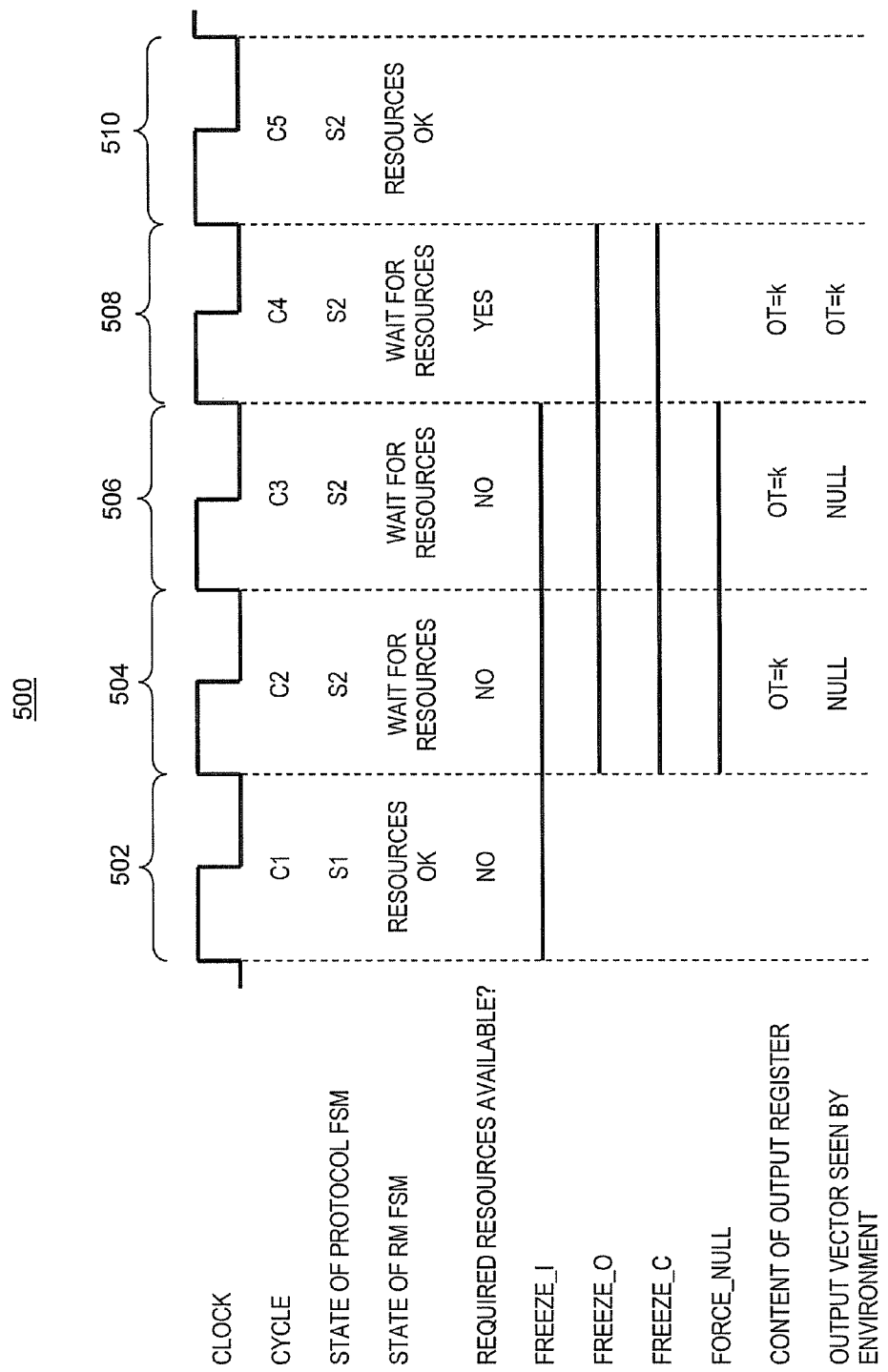
FIG. 5A is a timing diagram depicting examples of states of the resource management FSM and the protocol FSM in a sequence of cycles included in the process of FIGS. 4A-4B, which is implemented in a first freeze model in the system of FIG. 1B, in accordance with embodiments of the present invention.

FIG. 5A is a timing diagram depicting examples of states of the resource management FSM and the protocol FSM in a sequence of cycles included in the process of FIGS. 4A-4B, which is implemented in a first freeze model in the system of FIG. 1B, in accordance with embodiments of the present invention. Timing diagram 500 includes sets of information in columns 502, 504, 506, 508 and 510. Each set of information includes the following items, from the top to the bottom of diagram 500: a clock signal whose rising edge indicates when new data is clocked into latches or registers; an identifier of a cycle (e.g., C1, C2, etc.) of the FSM environment; a state of protocol FSM 102 (see FIG. 1B) (e.g., S1 or S2) during the cycle; a state of RM FSM 110 (see FIG. 1B) (e.g., Resources OK or Wait for Resources) during the cycle; an indication of whether the required resources are available (e.g., Yes or No) during the cycle; an indication of whether a Freeze_i signal is activated during the cycle to freeze input register 104 (see FIG. 1B) (i.e., a bar in the Freeze_i row indicates that the Freeze_i signal is activated); an indication of whether a Freeze_o signal is activated during the cycle to freeze output register 108 (see FIG. 1B), (i.e., a bar in the Freeze_o row indicates that the Freeze_o signal is activated); an indication of whether a Freeze_c signal is activated during the cycle to freeze the current state register 106 (see FIG. 1B), (i.e., a bar in the Freeze_c row indicates that the Freeze_c signal is activated); an indication of whether a Force_Null signal is activated during the cycle to force the output vector to be seen as a null token by the FSM environment (i.e., a bar in the Force_Null row indicates that the Force_Null signal is activated); content of the output register 108 (see FIG. 1B); and what the output vector is seen as by the FSM environment (e.g., a null token or the contents of the output register).

Following the example shown in diagram 500, in cycle C1 (see column 502), the state of the protocol FSM 102 (see FIG. 1B) is S1 and the state of RM FSM 110 (see FIG. 1B) is Resources OK 302 (see FIG. 3) (see step 402 in FIG. 4A). The RM FSM determines that the required resources are not available (see step 406 in FIG. 4A) (i.e., the indicator in the Required Resources Available? row in column 502 is "No"); therefore, the RM FSM will transition to the Wait for Resources state 304 (see FIG. 3) (see step 412 in FIG. 4A and the Wait for Resources indicator in column 504). The protocol FSM calculates the output vector (i.e., OT=k), which is loaded into the output register 108 (see FIG. 1B) (see step 414 in FIG. 4A). The RM FSM activates the Freeze_i signal to freeze input register 104 (see FIG. 1B) (i.e., a bar is included in the Freeze_i row in column 502).

In cycle C2 (see column 504), as the Freeze_i, Freeze_o and Freeze_c signals are activated by the RM FSM, the protocol FSM is frozen (see step 420 in FIG. 4A) (i.e., bars are included in the Freeze_i, Freeze_o and Freeze_c rows of column 504). The RM FSM forces that the output vector is seen by the FSM environment as a null token (see step 422 in FIG. 4B) (i.e., a bar is included in the Force_Null row in column 504). The required resources are still not available in cycle C2 (i.e., the Required Resources Available? indicator in column 504 is "No").

In cycle C3 (see column 506), the information items are the same as the items in cycle C2. The required resources are still not available (i.e., the Required Resources Available? indicator in column 506 is "No").

In cycle C4 (see column 508), the required resources are now available, as determined by the RM FSM (see the Yes branch of step 424 in FIG. 4B); therefore the state of the RM FSM will transition to the Resources OK state 302 (see FIG. 3) (see step 428 in FIG. 4B). The RM FSM releases the Force_Null signal (i.e., there is no bar in the Force_Null row in column 508). Thus, the OT=k value included in the output register is seen by the FSM environment (see step 430 in FIG. 4B) (i.e., OT=k is the indicator in the Output Vector Seen by Environment row in column 508). The Freeze_o signal is still active in cycle C4 (i.e., a bar is included in the Freeze_o row in column 508). The Freeze_c signal is still active in C4 (i.e., a bar is included in the Freeze_c row in column 508). The Freeze_i signal is inactive (i.e., there is no bar included in the Freeze_i row in column 508); therefore, a new input token will be available in cycle C5.

In cycle C5 (see column 510), the protocol FSM is unfrozen and is able to process the next input event (see step 432 in FIG. 4B). Note that in FIG. 5A the signals Freeze_o and Freeze_c are equivalent signals. The diagram 500 is not intended to imply that two different signals are required to implement Freeze_o and Freeze_c. Persons skilled in the art will recognize that logic synthesis tools will generate only one signal, which will be used to control both the current state register 106 (see FIG. 1B) and the output register 108 (see FIG. 1B).

Figure 5B:
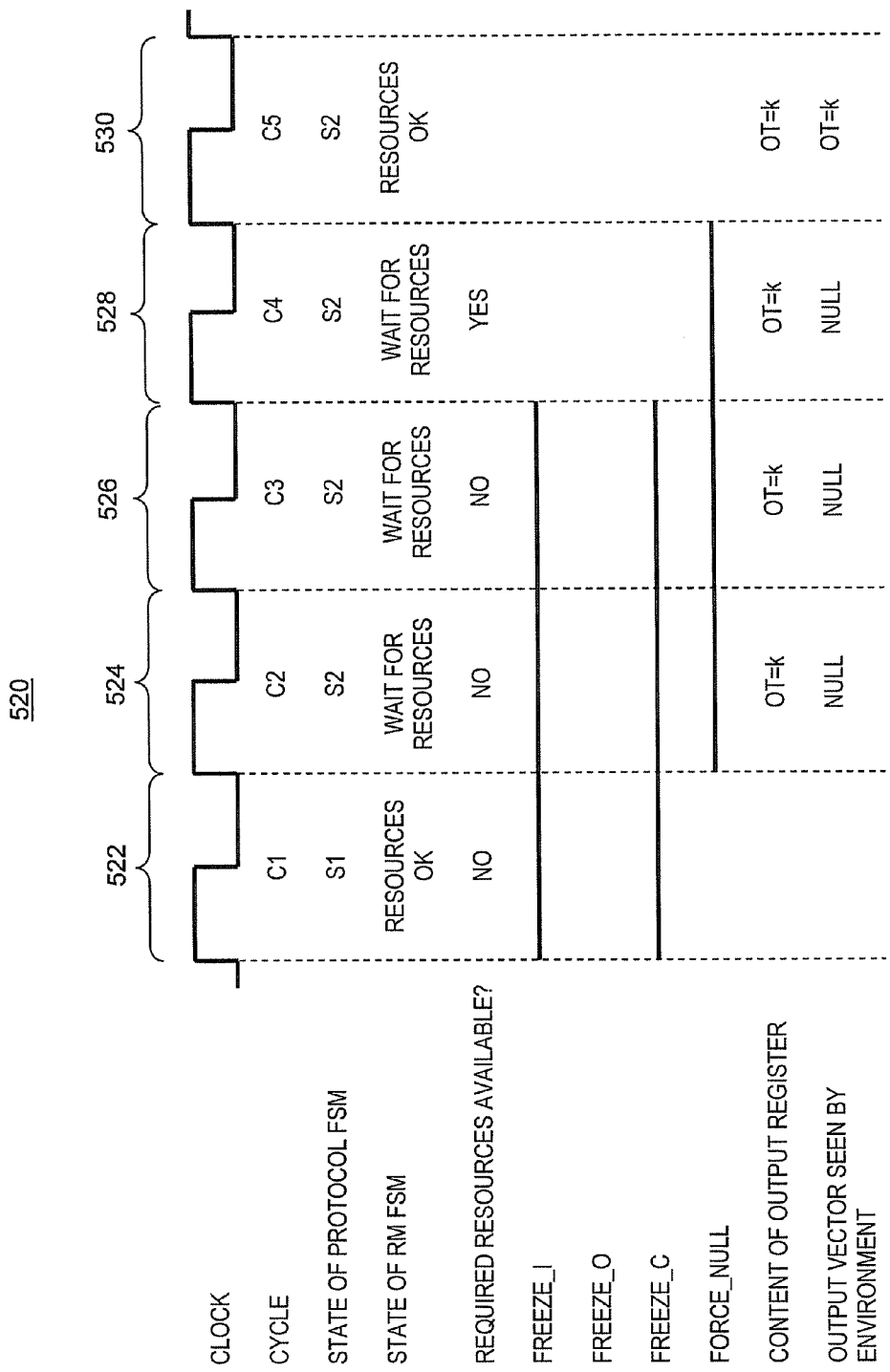
FIG. 5B is a timing diagram depicting examples of states of the resource management FSM and the protocol FSM in a sequence of cycles included in the process of FIGS. 4A-4B, which is implemented in a second freeze model in the system of FIG. 1B, in accordance with embodiments of the present invention.

FIG. 5B is a timing diagram depicting examples of states of the resource management FSM and the protocol FSM in a sequence of cycles included in the process of FIGS. 4A-4B, which is implemented in a second freeze model in the system of FIG. 1B, in accordance with embodiments of the present invention. Timing diagram 520 depicts an example in which system 100 of FIG. 1B freezes the input register 104 (see FIG. 1B) and the current state register 106 (see FIG. 1B) immediately in the cycle (i.e., cycle C1) in which the resource unavailability condition is detected. Effectively this means that the protocol FSM does 'see' the same input vector/current state condition until the required resource(s) become available. Therefore, during the time until the required resource(s) become available, the protocol FSM produces the same output vector/next state vector. To protect the FSM environment, again a null vector is generated by the RM FSM. In response to all the required resource(s) being available, the RM FSM unfreezes the protocol FSM but still activates the Null signal (see Cycle C4). The protocol FSM calculates in cycle C4 still the same output vector/next state vector, but in this cycle the next state is loaded into the current state register 106 (see FIG. 1B). Note that the RM FSM state transition diagram of FIG. 3 must be slightly changed to implement the timing chart of FIG. 5B. The change to FIG. 3 that is required to implement the timing chart of FIG. 5B will be apparent to those skilled in the art.

Note that in FIG. 5B the signals Freeze_i and Freeze_c are equivalent signals. The diagram 520 is not intended to imply that two different signals are required to implement Freeze_i and Freeze_c. Persons skilled in the art will recognize that logic synthesis tools will generate only one signal, which will be used to control both the input register 104 (see FIG. 1B) and the current state register 106 (see FIG. 1B). It should also be noted that the Freeze_o signal is not needed at all in the example depicted in FIG. 5B.

Figure 5C:
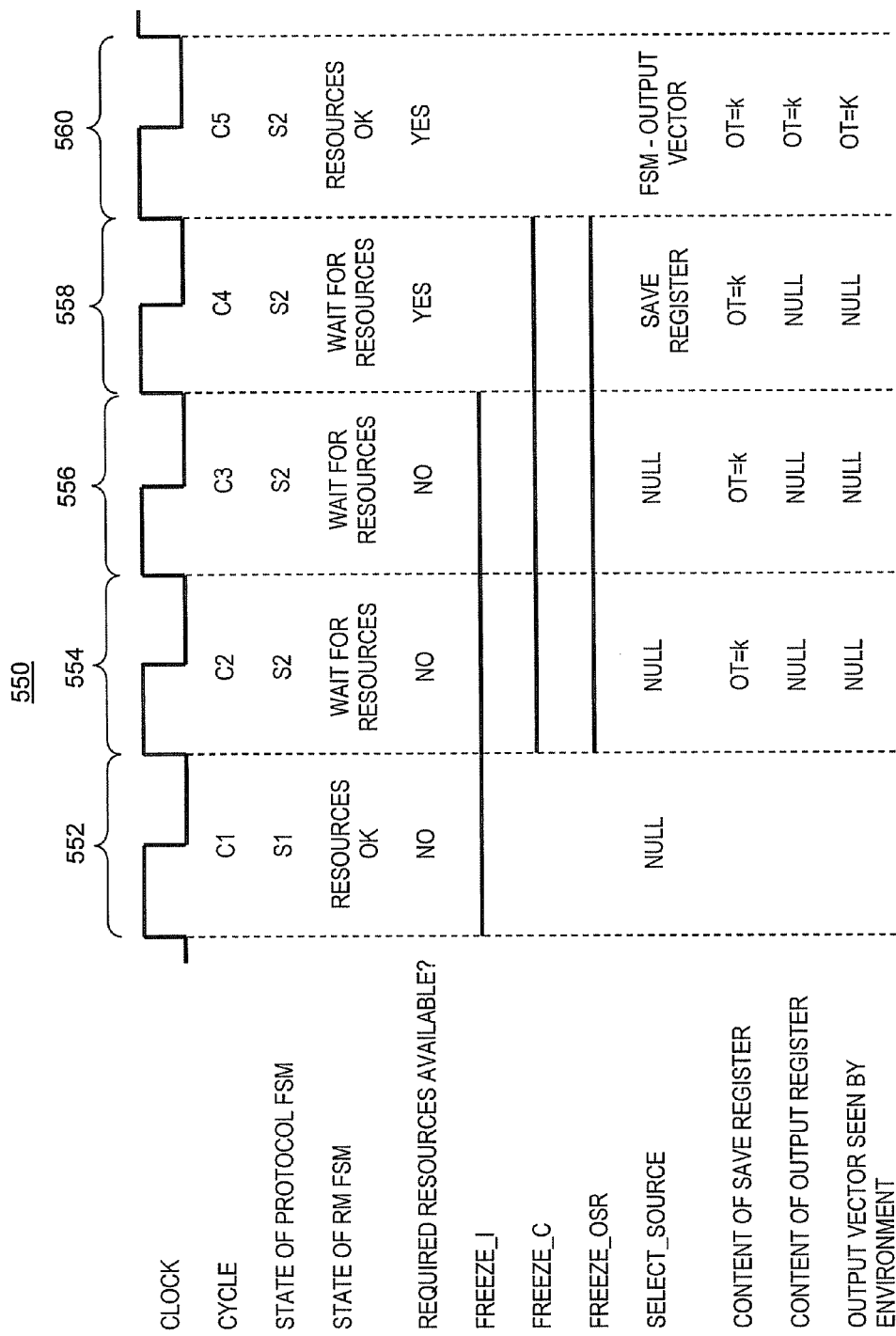
FIG. 5C is a timing diagram depicting examples of states of the resource management FSM and the protocol FSM in a sequence of cycles included in the process of FIGS. 4A-4B, which is implemented in the system of FIG. 1C, in accordance with embodiments of the present invention.

FIG. 5C is a timing diagram depicting examples of states of the resource management FSM and the protocol FSM in a sequence of cycles included in the process of FIGS. 4A-4B, which is implemented by the system of FIG. 1C, in accordance with embodiments of the present invention. Timing diagram 550 includes sets of information in columns 552, 554, 556, 558 and 560. Each set of information includes the following items, from the top to the bottom of diagram 550: a clock signal whose rising edge indicates when new data is clocked into latches or registers; an identifier of a cycle (e.g., C1, C2, etc.) of the FSM environment; a state of protocol FSM 102 (see FIG. 1C) (e.g., S1 or S2) during the cycle; a state of RM FSM 110 (see FIG. 1C) (e.g., Resources OK or Wait for Resources) during the cycle; an indication of whether the required resources are available (e.g., Yes or No) during the cycle; an indication of whether a Freeze_i signal is activated during the cycle to freeze input register 104 (see FIG. 1C) (i.e., a bar in the Freeze_i row indicates that the Freeze_i signal is activated); an indication of whether a Freeze_c signal is activated during the cycle to freeze current state register 106 (see FIG. 1C) (i.e., a bar in the Freeze_c row indicates that the Freeze_c signal is activated); an indication of whether a Freeze_osr signal is activated during the cycle to freeze output save register 152 (see FIG. 1C) (i.e., a bar in the Freeze_osr row indicates that the Freeze_osr signal is activated); the source being selected by multiplexer 114 (see FIG. 1C): Null (i.e., a null token indicating a null token), Save Register (i.e., the contents of output save register 152 (see FIG. 1C)), or FSM—Output Vector (i.e., the output vector 156 (see FIG. 1C) transmitted from protocol FSM 102 (see FIG. 1C)); content of the output save register 152 (see FIG. 1C); content of the output register 108 (see FIG. 1C); and what the output vector is seen as by the FSM environment (e.g., a null token or the contents of the output save register 152 (see FIG. 1C)).

Following the example shown in diagram 550, in cycle C1 (see column 552), the state of the protocol FSM 102 (see FIG. 1C) is S1 and the state of RM FSM 110 (see FIG. 1C) is Resources OK 302 (see FIG. 3). The RM FSM determines that the required resources are not available (i.e., the indicator in the Required Resources Available? row in column 552 is "No"); therefore, the RM FSM will transition to the Wait for Resources state 304 (see FIG. 3) (see the Wait for Resources indicator in column 504). The protocol FSM calculates the output vector (i.e., OT=k), which is to be loaded into the output save register 152 (see FIG. 1C). The RM FSM activates the Freeze_i signal to freeze input register 104 (see FIG. 1C) (i.e., a bar is included in the Freeze_i row in column 552). The RM FSM activates the Select_Source signal to select the Null Token.

In cycle C2 (see column 554), because the Freeze_i, Freeze_c and Freeze_osr signals are activated by the RM FSM, the protocol FSM is frozen (i.e., bars are included in the Freeze_i, Freeze_c and Freeze_osr rows of column 554). The RM FSM forces that the output vector is seen by the FSM environment as a null token. The required resources are still not available in cycle C2 (i.e., the Required Resources Available? indicator in column 554 is "No"). The output vector (i.e., OT=k) is loaded in the output save register 152 (see FIG. 1C). The output register 108 (see FIG. 1C) is loaded with the null token selected in response to the Select_Source signals.

In cycle C3 (see column 556), the information items are the same as the items in cycle C2. The required resources are still not available (i.e., the Required Resources Available? indicator in column 556 is "No").

In cycle C4 (see column 558), the required resources are now available, as determined by the RM FSM; therefore the state of the RM FSM will transition to the Resources OK state 302 (see FIG. 3). The RM FSM sends Select_Source signals that result in the save output register 152 (see FIG. 1C) being selected (i.e., Save Register is in the Select_Source row in column 558). Thus, the OT=k value included in the output save register will be seen by the FSM environment in the next cycle. The Freeze_c and Freeze_osr signals are still active in cycle C4 (i.e., bars are included in the Freeze_c and Freeze_osr rows in column 558). The Freeze_i signal is inactive (i.e., there is no bar included in the Freeze_i row in column 558); therefore, a new input token will be available in cycle C5.

In cycle C5 (see column 560), the state of RM FSM is now Resources OK. The content of the output register 108 (see FIG. 1C) is the output vector (i.e., OT=k). The output vector as seen by the FSM environment is also OT=k. The protocol FSM is unfrozen (i.e., the Freeze_i, Freeze_c and Freeze_osr signals are inactive and no bars are included in the Freeze_i, Freeze_c and Freeze_osr rows in column 560). Thus, the protocol FSM is able to process the next input event. Note again that the RM FSM state transition diagram of FIG. 3 must be slightly changed to implement the timing diagram of FIG. 5B. This change to FIG. 3 is a simple task for persons skilled in the art.

Computer System

Figure 6:
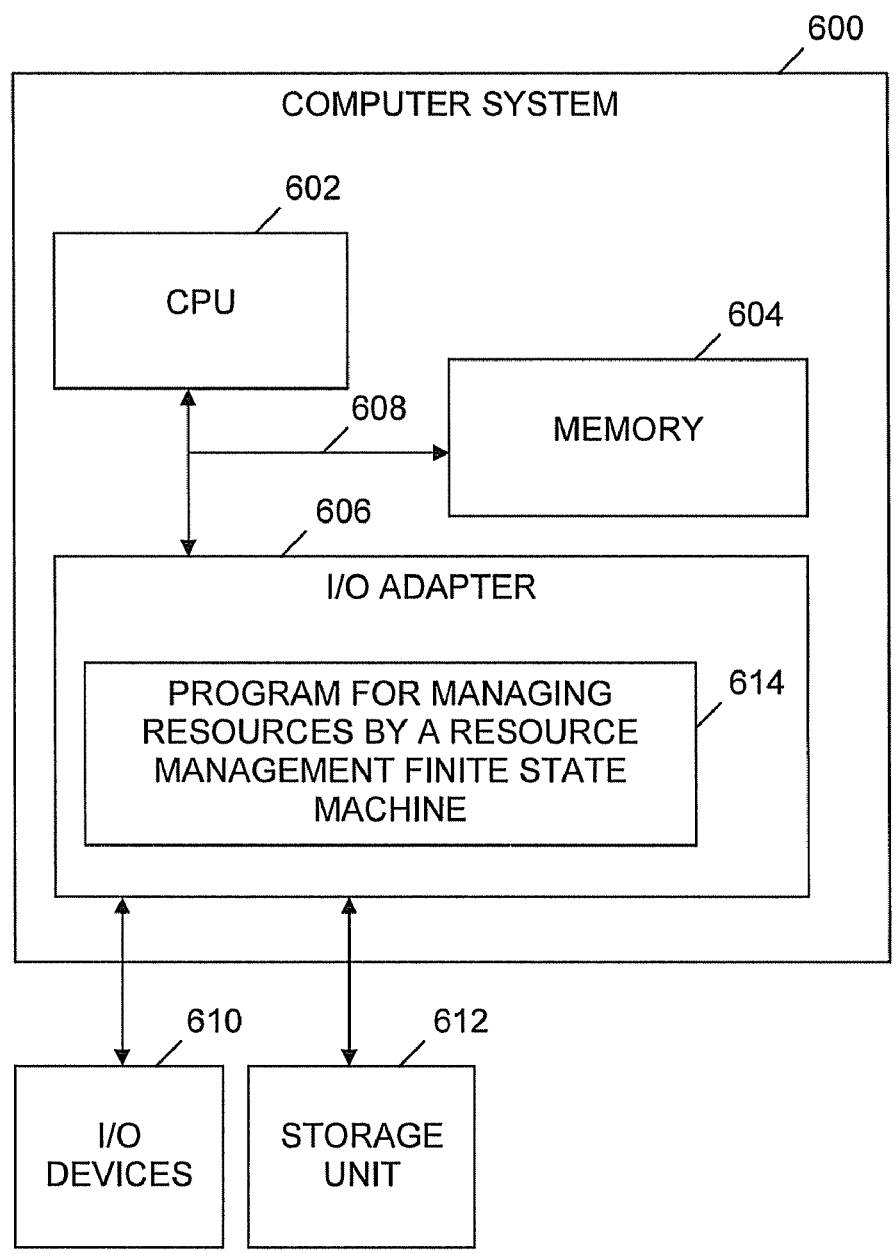
FIG. 6 is a computer system that implements the process of FIGS. 4A-4B, in accordance with embodiments of the present invention.

FIG. 6 is a computer system that implements the process of FIGS. 4A-4B, in accordance with embodiments of the present invention. Computer system 600 generally comprises a central processing unit (CPU) 602, a memory 604, an input/output (I/O) adapter 606, and a bus 608. In one embodiment, computer system 600 implements protocol FSM 102 (see FIG. 1B) and RM FSM 110 (see FIG. 1B). Further, computer system 600 is coupled to I/O devices 610 and a computer data storage unit 612. CPU 602 performs computation and control functions of computer system 600. CPU 602 may comprise a single processing unit, or be distributed across one or more processing units in one or more locations (e.g., on a client and server).

Memory 604 may comprise any known computer readable storage medium, which is described below. In one embodiment, cache memory elements of memory 604 provide temporary storage of at least some program code (not shown) in order to reduce the number of times code must be retrieved from bulk storage while instructions of the program code are carried out. Moreover, similar to CPU 602, memory 604 may reside at a single physical location, comprising one or more types of data storage, or be distributed across a plurality of physical systems in various forms. Further, memory 604 can include data distributed across, for example, a local area network (LAN) or a wide area network (WAN). Still further, memory 604 may include systems not shown in FIG. 6, such as an operating system (e.g., Linux) that runs on CPU 602 and provides control of various components within and/or connected to computer system 600.

I/O adapter 606 comprises any system for exchanging information to or from an external source such as I/O devices 610. Examples of I/O adapter 606 include an InfiniBand, PCI Express, Fibre Channel or Ethernet networking adapter. I/O devices 610 comprise any known type of external device, including a display device (e.g., monitor), keyboard, mouse, printer, speakers, handheld device, facsimile, etc. Bus 608 provides a communication link between each of the components in computer system 600, and may comprise any type of transmission link, including electrical, optical, wireless, etc.

I/O adapter 606 also allows computer system 600 to store and retrieve information (e.g., data or program instructions) from an auxiliary storage device such as computer data storage unit 612 or another computer data storage unit (not shown). Computer data storage unit 612 may comprise any known computer readable storage medium, which is described below. For example, computer data storage unit 612 may be a non-volatile data storage device, such as a magnetic disk drive (i.e., hard disk drive) or an optical disc drive (e.g., a CD-ROM drive which receives a CD-ROM disk) or it may be storage units accessed via a Storage Area Network.

I/O adapter 606 may include logic 614 for managing resources by RM FSM 110 (see FIG. 1B) (e.g., the process of FIGS. 4A-4B).

I/O adapter 606 may include input register 104 (see FIG. 1B), output register 108 (see FIG. 1B) and current states 106 (see FIG. 1B).

As will be appreciated by one skilled in the art, the present invention may be embodied as a system, method, logic circuit or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "module" or "system" (e.g., system 100 in FIG. 1B or computer system 600). Furthermore, an embodiment of the present invention may take the form of a computer program product embodied in one or more computer readable medium(s) (e.g., I/O adapter 606, memory 604 or computer data storage unit 612) having computer readable program code (e.g., program code 614) embodied or stored thereon.

Any combination of one or more computer readable medium(s) (e.g., I/O adapter 606, memory 604 and computer data storage unit 612) may be utilized. The computer readable medium may be a computer readable signal medium or a computer readable storage medium. A computer readable storage medium may be, for example, but not limited to, an electronic, magnetic, optical, electromagnetic, infrared or semiconductor system, apparatus, device or any suitable combination of the foregoing. A non-exhaustive list of more specific examples of the computer-readable storage medium includes: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with a system, apparatus, or device for carrying out instructions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with a system, apparatus, or device for carrying out instructions.

Program code (e.g., program code 614) embodied on a computer readable medium may be transmitted using any appropriate medium, including but not limited to wireless, wireline, optical fiber cable, RF, etc., or any suitable combination of the foregoing.

Computer program code (e.g., program code 614) for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may be carried out entirely on a user's computer, partly on the user's computer, as a stand-alone software package, partly on the user's computer and partly on a remote computer or entirely on the remote computer or server, where the aforementioned user's computer, remote computer and server may be, for example, computer system 600 or another computer system (not shown) having components analogous to the components of computer system 600 included in FIG. 6. In the latter scenario, the remote computer may be connected to the user's computer through any type of network (not shown), including a LAN or a WAN, or the connection may be made to an external computer (e.g., through the Internet using an Internet Service Provider).

Aspects of the present invention are described herein with reference to flowchart illustrations (e.g., FIGS. 4A-4B) and/or block diagrams of methods, apparatus (systems) (e.g., FIGS. 1B, 1C and 6), and computer program products according to embodiments of the invention. It will be understood that each block of the flowchart illustrations and/or block diagrams, and combinations of blocks in the flowchart illustrations and/or block diagrams, can be implemented by computer program instructions (e.g., program code 614). These computer program instructions may be provided to a processor (e.g., CPU 602) of a general purpose computer, special purpose computer, or other programmable data processing apparatus to produce a machine, such that the instructions, which are carried out via the processor of the computer or other programmable data processing apparatus, create means for implementing the functions/acts specified in the flowchart and/or block diagram block or blocks.

These computer program instructions may also be stored in a computer readable medium (e.g., I/O adapter 606, memory 604 or computer data storage unit 612) that can direct a computer (e.g., computer system 600), other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer (e.g., computer system 600), other programmable data processing apparatus, or other devices to cause a series of operational steps to be performed on the computer, other programmable apparatus, or other devices to produce a computer implemented process such that the instructions which are carried out on the computer, other programmable apparatus, or other devices provide processes for implementing the functions/acts specified in the flowchart and/or block diagram block or blocks.

In an alternate embodiment, computer system 600 does not include program 614, but further comprises a processor coupled to a computer-readable storage medium that includes current state 106 (see FIG. 1B) and the contents of input register 104 (see FIG. 1B) and output register 108 (see FIG. 1B). The processor includes one or more logic circuits that include one or more blocks of combinational logic that when carried out by the processor implement the process of managing resources by a RM FSM, where the process of managing resources is included in the method of FIGS. 4A-4B.

In another alternate embodiment, computer system 600 does not include program 614, but further includes a logic circuit (not shown) that includes multiple interconnected electrically conductive elements that provide combinational logic that when carried out by the logic circuit implement the method of FIGS. 4A-4B.

Any of the components of an embodiment of the present invention can be deployed, managed, serviced, etc. by a service provider that offers to deploy or integrate computing infrastructure with respect to managing resources by a RM FSM. Thus, an embodiment of the present invention discloses a process for supporting computer infrastructure, comprising integrating, hosting, maintaining and deploying computer-readable code (e.g., program code 614) into a computer system (e.g., computer system 600), wherein the code in combination with the computer system is capable of performing a process of managing resources by a RM FSM.

In another embodiment, the invention provides a business method that performs the process steps of the invention on a subscription, advertising and/or fee basis. That is, a service provider, such as a Solution Integrator, can offer to create, maintain, support, etc. a process of managing resources by a RM FSM. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flowchart in FIGS. 4A-4B and the block diagrams in FIG. 1B, FIG. 1C and FIG. 6 illustrate the architecture, functionality, and operation of possible implementations of systems, methods, and computer program products according to various embodiments of the present invention. In this regard, each block in the flowchart or block diagrams may represent a module, segment, or portion of code (e.g., program code 614), which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A logic circuit-implemented method of a resource management finite state machine (RM FSM) managing one or more resources required by a protocol finite state machine (protocol FSM) in a FSM environment, said method comprising:

said RM FSM receiving a resource request vector from said protocol FSM, wherein said resource request vector indicates said one or more resources required by said protocol FSM, wherein said RM FSM is in a first RM FSM state prior to said receiving said resource request vector, and wherein said RM FSM being in said first RM FSM state indicates said one or more resources are available to said protocol FSM;

said RM FSM determining not all of said one or more resources are available to said protocol FSM;

subsequent to said determining not all of said one or more resources are available, said protocol FSM transitioning from being in a first protocol FSM state (S1) to being in a second protocol FSM state (S2);

subsequent to said determining not all of said one or more resources are available, said protocol FSM generating an output vector and loading said output vector into a first register for storing output, wherein said first register is coupled to said protocol FSM;

subsequent to said determining not all of said one or more resources are available, said RM FSM transitioning to a second RM FSM state that indicates not all of said one or more resources are available to said protocol FSM;

subsequent to said determining not all of said one or more resources are available, a logic circuit that implements said RM FSM freezing an input register coupled to said protocol FSM;

subsequent to said determining not all of said one or more resources are available, said logic circuit that implements said RM FSM controlling said FSM environment by freezing said first register, freezing a current state register coupled to said protocol FSM, and forcing said output vector to be seen by said FSM environment as a null token;

subsequent to said RM FSM controlling said FSM environment, said RM FSM determining said one or more resources are available to said protocol FSM;

subsequent to said determining said one or more resources are available, said RM FSM transitioning to said first RM FSM state;

subsequent to said determining said one or more resources are available, said RM FSM enabling said output vector to be seen by said FSM environment as said output vector loaded into said first register by said loading; and subsequent to said determining said one or more resources are available, said logic circuit that implements said RM FSM unfreezing said protocol FSM.

2. The method of claim 1, wherein said unfreezing said protocol FSM includes:

said RM FSM unfreezing said input register in a first cycle; and said RM FSM unfreezing said first register and said current state register in a second cycle, wherein said second cycle is subsequent to said first cycle.

3. The method of claim 1, further comprising:

prior to said receiving said resource request vector, said protocol FSM processing a first input event, wherein said processing said first input event includes sending said resource request vector to said RM FSM;

enabling said protocol FSM to process a second input event in response to said unfreezing said protocol FSM; and said protocol FSM processing said second input event subsequent to said enabling said protocol FSM to process said second input event.

4. The method of claim 1, further comprising:

loading a current content into a register;

freezing said register subsequent to said loading said current content;

in response to freezing said register, said register feeding back said current content of said register into a multiplexer; and subsequent to said feeding back said current content, said multiplexer loading said current content into said register and said multiplexer not loading a new value into said register, wherein said register is selected from the group consisting of said input register, said current state register, and said first register, wherein said freezing said register is said freezing said input register if said register is said input register, wherein said freezing said register is said freezing said current state register if said register is said current state register, and wherein said freezing said register is said freezing said first register if said register is said first register.

5. The method of claim 4, further comprising:

unfreezing said register subsequent to said loading said current content into said register, wherein said unfreezing said register is included in said unfreezing said protocol FSM; and in response to unfreezing said register, said multiplexer loading said new value into said register, wherein said unfreezing said register is unfreezing said input register if said register is said input register, wherein said unfreezing said register is unfreezing said current state register if said register is said current state register, and wherein said unfreezing said register is unfreezing said first register if said register is said first register.

6. The method of claim 1, wherein said forcing said output vector to be seen by said FSM environment as a null token includes:

said RM FSM sending a signal to a multiplexer; and said multiplexer selecting a null token to be output instead of selecting said output vector to be output.

7. The method of claim 1, wherein said determining not all of said one or more resources are available, said protocol FSM transitioning to being in said S2, said generating said output vector, said RM FSM transitioning to said second RM FSM state, and said freezing said input register are performed in a cycle k, wherein said freezing said first register, said freezing said current state register and said forcing said output vector to be seen by said FSM environment as said null token are performed in a cycle (k+1), and wherein said determining said one or more resources are available, said RM FSM transitioning to said first RM FSM state, and said enabling said output vector to be seen by said FSM environment as said output vector are performed in a cycle that is subsequent to cycle (k+1).

8. The method of claim 1, wherein said protocol FSM transitioning from said S1 to said S2 is performed in response to said determining not all of said one or more resources are available.

9. The method of claim 1, wherein said protocol FSM transitioning from said S1 to said S2 is performed in response to said RM FSM determining said one or more resources are available to said protocol FSM.

10. A logic circuit comprising:

multiple interconnected electrically conductive elements configured to perform a method of a resource management finite state machine (RM FSM) managing one or more resources required by a protocol finite state machine (protocol FSM) in a FSM environment, wherein said multiple interconnected electrically conductive elements include said RM FSM and said protocol FSM, said method comprising:

said RM FSM receiving a resource request vector from said protocol FSM, wherein said resource request vector indicates said one or more resources required by said protocol FSM, wherein said RM FSM is in a first RM FSM state prior to said receiving said resource request vector, and wherein said RM FSM being in said first RM FSM state indicates said one or more resources are available to said protocol FSM;

said RM FSM determining not all of said one or more resources are available to said protocol FSM;

subsequent to said determining not all of said one or more resources are available, said protocol FSM transitioning from being in a first protocol FSM state (S1) to being in a second protocol FSM state (S2);

subsequent to said determining not all of said one or more resources are available, said protocol FSM generating an output vector and loading said output vector into a first register for storing output, wherein said first register is coupled to said protocol FSM;

subsequent to said determining not all of said one or more resources are available, said RM FSM transitioning to a second RM FSM state that indicates not all of said one or more resources are available to said protocol FSM;

subsequent to said determining not all of said one or more resources are available, said RM FSM freezing an input register coupled to said protocol FSM;

subsequent to said determining not all of said one or more resources are available, said RM FSM controlling said FSM environment by freezing said first register, freezing a current state register coupled to said protocol FSM, and forcing said output vector to be seen by said FSM environment as a null token;

subsequent to said RM FSM controlling said FSM environment, said RM FSM determining said one or more resources are available to said protocol FSM;

subsequent to said determining said one or more resources are available, said RM FSM transitioning to said first RM FSM state;

subsequent to said determining said one or more resources are available, said RM FSM enabling said output vector to be seen by said FSM environment as said output vector loaded into said first register by said loading; and subsequent to said determining said one or more resources are available, said RM FSM unfreezing said protocol FSM.

11. The logic circuit of claim 10, wherein said unfreezing said protocol FSM includes:

said RM FSM unfreezing said input register in a first cycle; and said RM FSM unfreezing said first register and said current state register in a second cycle, wherein said second cycle is subsequent to said first cycle.

12. The logic circuit of claim 10, wherein said method further comprises:

prior to said receiving said resource request vector, said protocol FSM processing a first input event, wherein said processing said first input event includes sending said resource request vector to said RM FSM;

enabling said protocol FSM to process a second input event in response to said unfreezing said protocol FSM; and said protocol FSM processing said second input event subsequent to said enabling said protocol FSM to process said second input event.

13. The logic circuit of claim 10, wherein said method further comprises:

loading a current content into a register;

freezing said register subsequent to said loading said current content;

in response to freezing said register, said register feeding back said current content of said register into a multiplexer; and subsequent to said feeding back said current content, said multiplexer loading said current content into said register and said multiplexer not loading a new value into said register, wherein said register is selected from the group consisting of said input register, said current state register, and said first register, wherein said freezing said register is said freezing said input register if said register is said input register, wherein said freezing said register is said freezing said current state register if said register is said current state register, and wherein said freezing said register is said freezing said first register if said register is said first register.

14. The logic circuit of claim 13, wherein said method further comprises:

unfreezing said register subsequent to said loading said current content into said register, wherein said unfreezing said register is included in said unfreezing said protocol FSM; and in response to unfreezing said register, said multiplexer loading said new value into said register, wherein said unfreezing said register is unfreezing said input register if said register is said input register, wherein said unfreezing said register is unfreezing said current state register if said register is said current state register, and wherein said unfreezing said register is unfreezing said first register if said register is said first register.

15. The logic circuit of claim 10, wherein said forcing said output vector to be seen by said FSM environment as a null token includes:

said RM FSM sending a signal to a multiplexer; and said multiplexer selecting a null token to be output instead of selecting said output vector to be output.

16. The logic circuit of claim 10, wherein said determining not all of said one or more resources are available, said protocol FSM transitioning to being in said S2, said generating said output vector, said RM FSM transitioning to said second RM FSM state, and said freezing said input register are performed in a cycle k, wherein said freezing said first register, said freezing said current state register and said forcing said output vector to be seen by said FSM environment as said null token are performed in a cycle (k+1), and wherein said determining said one or more resources are available, said RM FSM transitioning to said first RM FSM state, and said enabling said output vector to be seen by said FSM environment as said output vector are performed in a cycle that is subsequent to cycle (k+1).

17. The logic circuit of claim 10, wherein said protocol FSM transitioning from said S1 to said S2 is performed in response to said determining not all of said one or more resources are available.

18. The logic circuit of claim 10, wherein said protocol FSM transitioning from said S1 to said S2 is performed in response to said RM FSM determining said one or more resources are available to said protocol FSM.

19. A computer system comprising a processor that includes the logic circuit of claim 10.

20. A computer system comprising:
a processor;
a computer-readable memory unit coupled to said processor; and
an input/output (I/O) adapter coupled to said processor and said memory unit, said I/O adapter including a logic circuit including multiple interconnected electrically conductive elements configured to perform a method of a resource management finite state machine (RM FSM) managing one or more resources required by a protocol finite state machine (protocol FSM) in a FSM environment, wherein said multiple interconnected electrically conductive elements include said protocol FSM and said RM FSM, said method comprising:
said RM FSM receiving a resource request vector from said protocol FSM, wherein said resource request vector indicates said one or more resources required by said protocol FSM, wherein said RM FSM is in a first RM FSM state prior to said receiving said resource request vector, and wherein said RM FSM being in said first RM FSM state indicates said one or more resources are available to said protocol FSM;
said RM FSM determining not all of said one or more resources are available to said protocol FSM;
subsequent to said determining not all of said one or more resources are available, said protocol FSM transitioning from being in a first protocol FSM state (S1) to being in a second protocol FSM state (S2);
subsequent to said determining not all of said one or more resources are available, said protocol FSM generating an output vector and loading said output vector into a first register for storing output, wherein said first register is coupled to said protocol FSM;
subsequent to said determining not all of said one or more resources are available, said RM FSM transitioning to a second RM FSM state that indicates not all of said one or more resources are available to said protocol FSM;
subsequent to said determining not all of said one or more resources are available, said RM FSM freezing an input register coupled to said protocol FSM;
subsequent to said determining not all of said one or more resources are available, said RM FSM controlling said FSM environment by freezing said first register, freezing a current state register coupled to said protocol FSM, and forcing said output vector to be seen by said FSM environment as a null token;
subsequent to said RM FSM controlling said FSM environment, said RM FSM determining said one or more resources are available to said protocol FSM;
subsequent to said determining said one or more resources are available, said RM FSM transitioning to said first RM FSM state;
subsequent to said determining said one or more resources are available, said RM FSM enabling said output vector to be seen by said FSM environment as said output vector loaded into said first register by said loading; and
subsequent to said determining said one or more resources are available, said RM FSM unfreezing said protocol FSM.

21. The computer system of claim 20, wherein said unfreezing said protocol FSM includes:
said RM FSM unfreezing said input register in a first cycle; and
said RM FSM unfreezing said first register and said current state register in a second cycle, wherein said second cycle is subsequent to said first cycle.

22. The computer system of claim 20, wherein said method further comprises:
prior to said receiving said resource request vector, said protocol FSM processing a first input event, wherein said processing said first input event includes sending said resource request vector to said RM FSM;
enabling said protocol FSM to process a second input event in response to said unfreezing said protocol FSM; and
said protocol FSM processing said second input event subsequent to said enabling said protocol FSM to process said second input event.

23. The computer system of claim 20, wherein said method further comprises:
loading a current content into a register;
freezing said register subsequent to said loading said current content;
in response to freezing said register, said register feeding back said current content of said register into a multiplexer; and
subsequent to said feeding back said current content, said multiplexer loading said current content into said register and said multiplexer not loading a new value into said register,
wherein said register is selected from the group consisting of said input register, said current state register, and said first register,
wherein said freezing said register is said freezing said input register if said register is said input register, wherein said freezing said register is said freezing said current state register if said register is said current state register, and wherein said freezing said register is said freezing said first register if said register is said first register.

24. The computer system of claim 23, wherein said method further comprises:
unfreezing said register subsequent to said loading said current content into said register, wherein said unfreezing said register is included in said unfreezing said protocol FSM; and
in response to unfreezing said register, said multiplexer loading said new value into said register,
wherein said unfreezing said register is unfreezing said input register if said register is said input register, wherein said unfreezing said register is unfreezing said current state register if said register is said current state register, and wherein said unfreezing said register is unfreezing said first register if said register is said first register.

25. The computer system of claim 20, wherein said forcing said output vector to be seen by said FSM environment as a null token includes:
said RM FSM sending a signal to a multiplexer; and
said multiplexer selecting a null token to be output instead of selecting said output vector to be output.

* * * * *